United States Patent Office 3,515,639
Patented June 2, 1970

3,515,639
AXIAL-MECHANISM CONTROL-ROD ACTUATOR
Kurt Pflugrad, Aix-en-Provence, France, assignor to
Commissariat a l'Energie Atomique
Filed Nov. 16, 1967, Ser No. 683,543
Int. Cl. G21c 7/14
U.S. Cl. 176—36                           3 Claims

ABSTRACT OF THE DISCLOSURE

A control rod actuator for a nuclear reactor comprising a leak-tight containment vessel and closed by a top seal plug. The actuator comprises a vertical translation mechanism which traverses said seal plug and is coupled at its upper end to a drive unit and at its lower end to said control rod by means of a releasable system. The vertical translation mechanism has two sections which can be engaged in end-to-end relation by coupling means. The upper section is adapted to slide within a guide tube carried by an arm which is rotatable about a vertical axis and fitted with a releasable bolt for retaining the lower section in the bottom position.

---

Figures 1A, 1B:
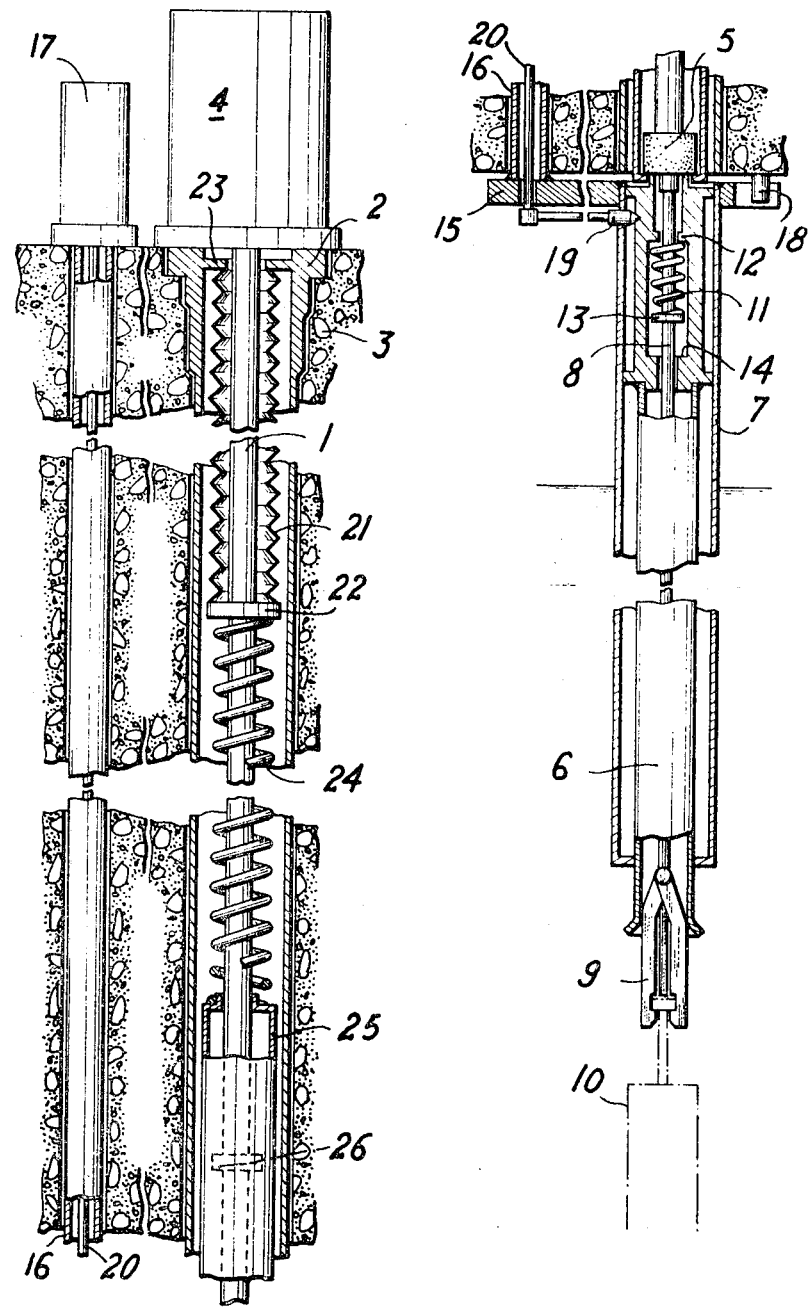

This invention relates to a control rod actuator for nuclear reactors in which the drive mechanism is disposed coaxially with the control rod and designed to permit operations entailing the transfer of fuel elements by means of a rotating arm.

The power of a nuclear reactor is usually controlled by means of elements referred to as control rods which have a high neutron-absorption capacity and which are inserted in the reactor core to a greater or lesser depth. The mechanism employed for this purpose must permit not only the slow downward and upward motion of said control rods but also their fast insertion in the event of a sudden increase in reactivity, in which case the rods perform the function of safety rods. For the purpose of carrying out the slow translational movements of the control rods, it is known to make use of screw-and-nut or rack-and-pinion systems, hydraulic or pneumatic jacks, electromagnetic systems, cables or chains. Fast insertions are often initiated by opening the electric circuit of an electromagnet, the driving power being supplied by the weight of the control rod, by a spring or a jack which drives the moving system coupled to the absorber element either directly or through an epicyclic gear train.

The design of control rod drive mechanisms is largely governed by operations involving transfer of fuel elements from the reactor, in particular when such operations are performed by means of a rotating arm. As a condition which is essential to the execution of the transfer operation referred to, the space located between the seal plug and the assembly head must be freed over a predetermined diameter.

The present invention, which provides a perfect solution to this problem, relates to a control rod actuator for a nuclear reactor comprising a leak-tight containment vessel which is sealed by a top plug, wherein said actuator comprises a vertical-translation mechanism which traverses said plug and which is coupled to a drive unit at the upper end thereof and to said control rod at the lower end thereof by means of a releasable system, said actuator being characterized in that said vertical translation mechanism has two sections which can be engaged in end-to-end relation by coupling means, the length of said sections being such that said means are located at the level of the underface of the seal plug when the control rod is in the bottom position, and in that the lower section is adapted to slide within a guide tube carried by an arm which is capable of rotating about a vertical axis and fitted with a releasable locking-bolt for retaining said lower portion in the bottom position with the result that said arm can be rotated so as to displace the guide tube when the mechanism is in the bottom position and said sections are uncoupled.

Further properties and advantages of the present invention will be brought out by the following description which is given with reference to the accompanying drawings and in which one form of construction of said control rod actuator is given by way of explanation but not in any sense by way of limitation. In these drawings, FIG. 1a represents the top portion of the actuator and FIG. 1b represents the bottom portion.

As is apparent from these figures, a rod 1 is disposed inside a stationary liner tube 2 which is provided within the seal plug 3 of the reactor. Said rod is coupled at its upper end to a servomechanism 4 and endowed by this latter with a vertical translational movement within the tube 2. The lower end of the rod 1 is fitted with an electromagnet 5 for attaching an assembly 6 which is capable of sliding within a guide tube 7 as well as a rod 8 which is capable of sliding within said assembly.

The grappler 9 which is adapted to engage the control rod 10 is suspended from the aforesaid rod which controls its opening and closing movements. The length of the rod 1 and that of the assembly 6 are such that the electromagnet 5 is located at the level of the underface of the seal plug 3 when the control rod is in the bottom position (as shown in FIG. 1b). The sliding assembly 6 is constituted by a tube having an external diameter which must permit said tube to slide within the liner tube 2 and having an internal diameter, at least at the lower end, which must be such as to permit the engagement of the grappler 9. A spring 11 which is applied against a stop-collar 13 of the rod 8 exerts a downward thrust on said rod. The travel of said rod is limited at the bottom by a seating 14.

The guide tube 7 is fixed to a horizontal arm 15 which is in turn rigidly fixed to a tube 16; said tube is placed inside the seal plug 3 and can be driven in rotation about its axis by means of a servomechanism 17. A stop 18 ensures the correct positioning of the arm 15. A conepoint locking pin 19 which is also actuated by the servomechanism 17 through the intermediary of a rod 20 placed inside the tube 16 serves to lock the sliding assembly 6 to the guide tube 7 in the bottom position when the electromagnet 5 is not energized.

The reactor vessel is rendered impervious to outside agents by a bellow seal 21 which is concentric with the rod 1 and fixed in leak-tight manner, at one end to said rod on an annular abutment flange 22 and at the other end to the liner tube 2 on an annular abutment flange 23.

A spring 24, which is also concentric with the rod 1 and applied against the abutment collar 22, serves to impart to the sliding assembly 6 through the intermediary of a movable portion 25 the impluse which is necessary for the rapid dropping of the control rod 10. The travel of said movable portion is limited at the bottom by a stop collar 26 formed on the rod 1.

During normal operation, the sliding assembly 6 and the rod 8 are interlocked with the rod 1 by means of the electromagnet 5 so as to follow the upward and downward movements of said rod 1. When the rod 8 is drawn upwards by said electromagnet, the arms of the grappler 9 move radially inwards as they penetrate into the tube 6, thereby producing the closure of said grappler. Opening of the grappler is obtained in the bottom position by interrupting the supply of current to the electromagnet after having locked the sliding assembly 6 to the tube 7. The rod 8 is then thrust back downwards under the action of the spring 11 and the grappler arms accordingly separate since they are no longer subjected to the stress exerted by the wall of the tube 6.

In order to permit the execution of transfer operations when the sliding assembly has been locked to the tube and the current supply to the electromagnet has been cut off, the horizontal arm is caused to rotate through an angle of 180°, thereby leaving the free space which is necessary for said transfer operations.

In order to produce a rapid control rod drop, the current supply to the electromagnet is cut off and the spring 24 is simultaneously released, thereby impelling the movable portion 25; this impulse is transmitted to the sliding assembly 6 and the whole of the bottom portion of the device is accordingly projected downwards. Braking can be effected by means of a hydraulic or pneumatic shock absorber (which is not shown in the drawings).

It is readily understood, for example, that rapid control rod drops can be produced by means of a pneumatic jack and that the junction between the upper and lower sliding units can be provided by means of any suitable mechanical device.

What I claim is:

1. A control rod actuator in combination with a nuclear reactor having a leak-tight containment vessel which is sealed by a top plug, said actuator comprising a vertical translation mechanism moveably positioned in a duct which traverses said plug, said mechanism is coupled to a drive unit at the upper end thereof and to a control rod at the lower end thereof by means of a releasable system, said vertical translation mechanism has two sections which are engaged in end-to-end relation by coupling means, the length of said sections being such that said means are located at the level of the underface of the seal plug when the control rod is in the bottom position, and in that the lower section slides within a guide tube carried by an arm which rotates about a vertical axis and fitted with a releasable locking-bolt for retaining said lower section in the bottom position and means for rotating said arm to displace said guide tube when said mechanism is in the bottom position and said sections are uncoupled.

2. A control rod actuator in accordance with claim 1, wherein the upper section of the vertical translation mechanism includes means for propelling the lower section downwards.

3. A control rod actuator in accordance with claim 1, wherein the lower section of the vertical translation mechanism includes a coaxial grappler rod which is joined to the upper section of said mechanism by said coupling means and which is coupled at its lower end to a control-rod grappling system whose opening and closing movements are carried out in dependence on the vertical translational motion of said grappler rod and a unit which produces a downward thrust on said grappler rod so that the control rod is permitted to drop freely when said grappler rod is released from the upper section.

References Cited

UNITED STATES PATENTS

| 2,782,941 | 2/1957 | Lichtenberger et al. | |
| 3,139,384 | 6/1964 | Filloleau et al. | 176—36 |
| 3,186,914 | 6/1965 | Webb et al. | 176—30 |

FOREIGN PATENTS

| 1,335,149 | 7/1963 | France. |
| 1,182,405 | 7/1965 | Germany. |

CARL D. QUARFORTH, Primary Examiner

H. E. BEHREND, Assistant Examiner

U.S. Cl. X.R.

176—30